(12) United States Patent
Kim

(10) Patent No.: US 10,956,287 B2
(45) Date of Patent: Mar. 23, 2021

(54) FAILOVER MECHANISM WITH MINIMIZED PACKET LOSSES

(71) Applicant: International Business Machines Corporation, Armonk, NY (US)

(72) Inventor: Juliet M. Kim, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 29 days.

(21) Appl. No.: 16/133,743

(22) Filed: Sep. 18, 2018

(65) Prior Publication Data

US 2020/0089584 A1 Mar. 19, 2020

(51) Int. Cl.
*G06F 11/00* (2006.01)
*G06F 11/20* (2006.01)
*G06F 11/14* (2006.01)
*H04L 12/24* (2006.01)
*G06F 9/455* (2018.01)

(52) U.S. Cl.
CPC ...... *G06F 11/2005* (2013.01); *G06F 9/45558* (2013.01); *G06F 11/1484* (2013.01); *H04L 41/0668* (2013.01); *G06F 2009/45595* (2013.01)

(58) Field of Classification Search
CPC .................. G06F 11/2005; H04L 41/0668
See application file for complete search history.

(56) References Cited

U.S. PATENT DOCUMENTS

| 6,718,383 | B1 | 4/2004 | Hebert | |
| 8,892,706 | B1 | 11/2014 | Dalal | |
| 9,426,022 | B2 * | 8/2016 | Baratakke | G06F 11/2005 |
| 2006/0123204 | A1 * | 6/2006 | Brown | G06F 9/5077 711/153 |
| 2006/0250945 | A1 * | 11/2006 | Fernandes | H04L 41/0654 370/216 |
| 2008/0165771 | A1 * | 7/2008 | Gainey | H04L 12/4641 370/390 |
| 2012/0005671 | A1 * | 1/2012 | Baratakke | G06F 9/45541 718/1 |
| 2013/0194912 | A1 * | 8/2013 | Baratakke | H04L 41/0668 370/220 |
| 2014/0140201 | A1 | 5/2014 | Baratakke et al. | |
| 2014/0281671 | A1 | 9/2014 | Krishnasamy et al. | |
| 2015/0052382 | A1 | 2/2015 | Sarisky et al. | |
| 2017/0147456 | A1 | 5/2017 | Lee et al. | |

* cited by examiner

*Primary Examiner* — Michael Maskulinski

(74) *Attorney, Agent, or Firm* — Cantor Colburn LLP; David Quinn

(57) ABSTRACT

Provided are techniques for implementing shared Ethernet adapter (SEA) failover, including receiving a first ARP packet at a first SEA coupled to a first switch; parsing, by the first SEA, a first MAC address and VLAN ID (VID) corresponding to the first ARP packet; transmitting the first MAC address and VID to a second SEA coupled to a second switch; detecting the first SEA has transitioned from a primary configuration to an inactive configuration and the second SEA has transitioned from a backup configuration to the primary configuration; and responsive to the detecting, transmitting a reverse ARP packet to the second switch notifying the second switch that the first SEA has transitioned to an inactive configuration and that the second SEA has transitioned to an active configuration; and configuring the first switch to forward any subsequent packets to the second switch rather than the first SEA.

18 Claims, 7 Drawing Sheets

FAILOVER MECHANISM WITH MINIMIZED PACKET LOSSES

BACKGROUND

The present invention generally relates to computing, and more specifically, to failover mechanism with minimized packet losses.

Virtual input/output (I/O) servers include a network access component known as shared Ethernet adapter (SEA) and is used to bridge between a physical Ethernet adapter and one or more virtual Ethernet adapters. A physical Ethernet adapter is used to communicate outside of the hardware system, while a virtual Ethernet adapter is used to communicate between partitions of the same hardware system. The shared Ethernet adapter allows logical partitions on the Virtual Ethernet to share access to the physical Ethernet and communicates with standalone servers and logical partitions on other systems. The access is enabled by connecting internal VLANs with VLANs on external Ethernet switches. The Virtual Ethernet adapters that are used to configure a shared Ethernet adapter are trunk adapters. The trunk adapters cause the virtual Ethernet adapters to operate in a special mode, such that packets that are addressed to an unknown hardware address, for example, packets for external systems, may be delivered to the external physical switches. Since Virtual I/O server serves as the only physical contact to the outside world, if the Virtual I/O server fails for arbitrary reasons, including system crashes, hardware adapter failures, etc., other logical partitions that use the same Virtual I/O server for external communications via SEA will also fail.

SUMMARY

Embodiments of the present invention are directed to a computer-implemented method for failover mechanism with minimized packet losses. A non-limiting example of the computer-implemented method includes receiving a first address resolution protocol (ARP) packet at a first SEA coupled to a first switch; parsing, by the first SEA, a first MAC address and VLAN ID (VID) corresponding to the first ARP packet; transmitting the first MAC address and VID to a second SEA coupled to a second switch; detecting that the first SEA has transitioned from a primary configuration to an inactive configuration and that the second SEA has transitioned from a backup configuration to the primary configuration; and responsive to the detecting, transmitting a reverse ARP packet to the second switch coupled to the second SEA notifying the second switch that the first SEA has transitioned to an inactive configuration and that the second SEA has transitioned to an active configuration; and configuring the first switch to forward any subsequent packets to the second switch rather than the first SEA.

Embodiments of the present invention are directed to a system for failover mechanism with minimized packet losses. A non-limiting example of the system includes first shared SEA; a first switch coupled to the first SEA; a second SEA; a second switch coupled to the second SEA; a processor; and a computer-readable storage medium (CRSM) coupled to the processor. The processor is configured to receive a first address resolution protocol (ARP) packet at a first shared Ethernet adapter (SEA) coupled to a first switch; parse, by the first SEA, a first MAC address and VLAN ID (VID) corresponding to the first ARP packet; transmit the first MAC address and VID to a second SEA coupled to a second switch; detect that the first SEA has transitioned from a primary configuration to an inactive configuration and that the second SEA has transitioned from a backup configuration to the primary configuration; and responsive to the detection, transmit a reverse ARP packet to the second switch coupled to the second SEA notifying the second switch that the first SEA has transitioned to an inactive configuration and that the second SEA has transitioned to an active configuration; and configure the first switch to forward any subsequent packets to the second switch rather than the first SEA.

Embodiments of the invention are directed to a computer program product for failover mechanism with minimized packet losses, the computer program product comprising a computer readable storage medium having program instructions embodied therewith. The program instructions are executable by a processor to cause the processor to perform a method. A non-limiting example of the method includes receiving a first address resolution protocol (ARP) packet at a first SEA coupled to a first switch; parsing, by the first SEA, a first MAC address and VLAN ID (VID) corresponding to the first ARP packet; transmitting the first MAC address and VID to a second SEA coupled to a second switch; detecting that the first SEA has transitioned from a primary configuration to an inactive configuration and that the second SEA has transitioned from a backup configuration to the primary configuration; and responsive to the detecting, transmitting a reverse ARP packet to the second switch coupled to the second SEA notifying the second switch that the first SEA has transitioned to an inactive configuration and that the second SEA has transitioned to an active configuration; and configuring the first switch to forward any subsequent packets to the second switch rather than the first SEA.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
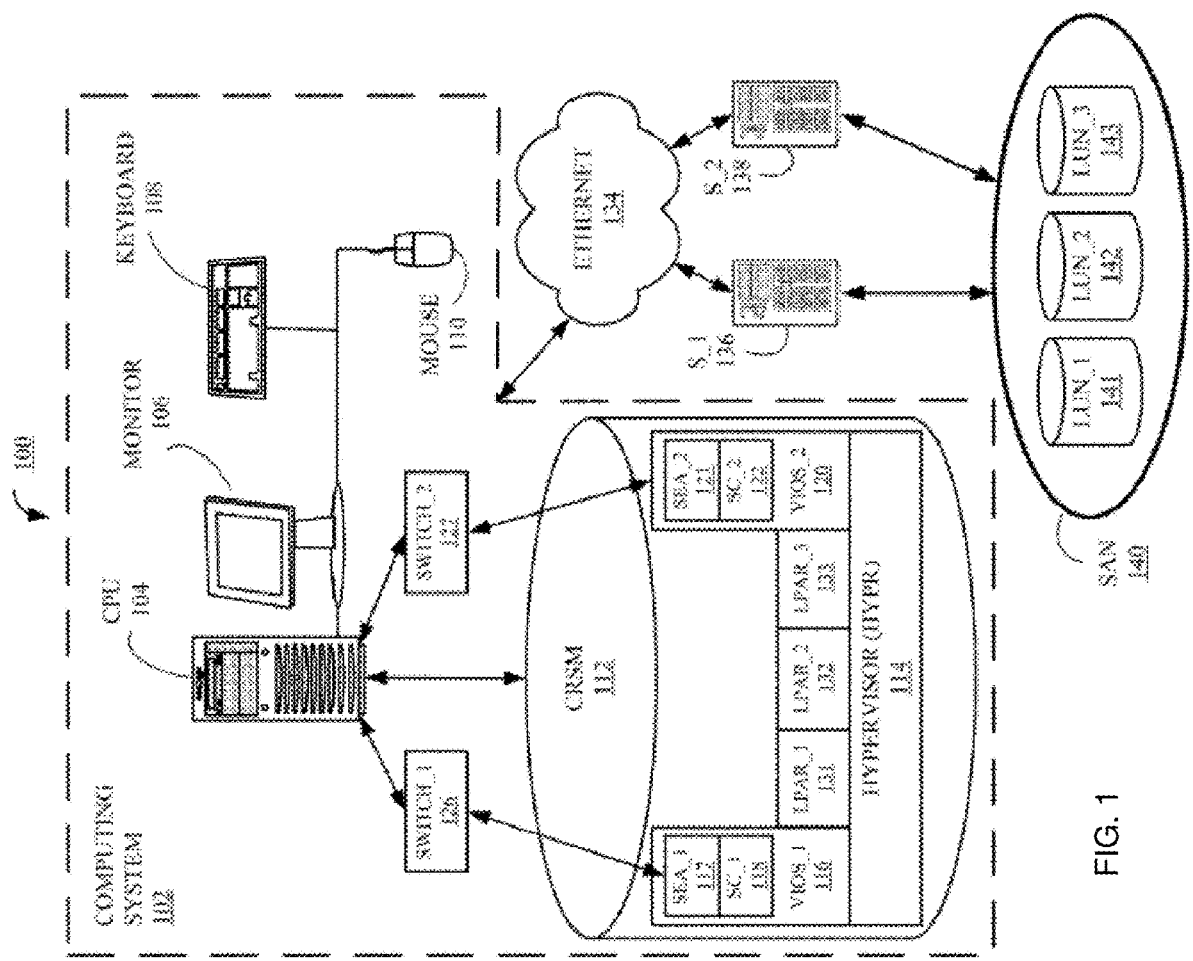
FIG. 1 depicts a block diagram of a computing system architecture in accordance with one or more embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, the shared Ethernet adapters (SEA) are configured to communicate with a network, switches, and other adapters. In addition, the SEAs are configured to store tables that are used to map the addresses of the messages being exchanged through the SEAs to the target destination.

As explained above, when a failover from a primary Shared Ethernet Adapter SEA to a backup SEA occurs, an SEA driver typically relies upon link reset to notify switches connected to a physical adapter of a route change. Drawbacks of relying on adapter link reset to notify the switch of client LPAR MAC routing change include, but are not limited to: 1) If the VIOS hosting the original primary SEA hangs or crashes, the primary SEA may not be able to issue a link reset; and 2) In some advanced adapters with built-in virtualization capability, e.g., IVE, adapter link reset is not supported. In addition, any delay for the switch to learn about the client LPAR MAC routing change may lead to packet losses. If a switch is not is not aware that a failover has occurred and continues to deliver packets to a dead or inactive SEA, significant packet loss and an interruption of communication may occur.

One potential workaround for this scenario is for each logical partition (LAPR) or virtual machine (VM) to generate traffic on the corresponding network when a failover is detected. However, LPARs must then monitor the status of the Virtual I/O Server (VIOS) by continuously pinging the VIOS and then react when the VIOS becomes unavailable. This approach generates additional traffic on the network and is neither scalable nor practical because it must be deployed on all LPARs and doesn't handle some scenarios such as when the SEA is in a standby mode.

In the event of a failover, the new primary VIOS/SEA sends reverse ARP messages with MAC address for all VLAN IDs that the SEA bridges, causing a leak of information which is a security violation. That is, reverse ARPs for MAC address along with VIDs not associated with the MAC address in an address table are transmitted to the switch. In accordance with VLAN standards, flooding (broadcast) MAC address and VID onto another VLAN (traffic between VLANs) is restricted so that end-stations on the VLANs are prohibited from listening to/receiving broadcasts not intended for them. Bridges must forward unicast, multicast, and broadcast traffic to the VLAN only that the traffic belongs to.

The techniques described herein, only transmit reverse ARPs for each MAC address for the corresponding VIDs that it is actually configured with which greatly reduces the number of messages that are transmitted in the network after detecting a failover.

Turning now to an overview of the aspects of the invention, one or more embodiments of the invention address the above-described shortcomings of the prior art by providing techniques that limit the distribution of reverse ARPs in the event of a failover. Responsive to detecting a failure, the SEA is designed to only transmit reverse ARP for MAC addresses and their configured VIDs to a switch in order to update the address table. The SEA tracks VIDs that are configured for each client LPAR and sends reverse ARP for valid MAC/VID combinations configured by client LPARs when failover/failback occurs.

Turning now to the figures, FIG. 1 is a block diagram of a computing system architecture 100 that may implement the claimed subject matter. A computing system 102 includes a central processing unit (CPU) 104, coupled to a monitor 106, a keyboard 108 and a pointing device, or "mouse," 110, which together facilitate human interaction with components of a computing system architecture 100 and computing system 102. Also included in computing system 102 and attached to CPU 104 is a computer-readable storage medium (CRSM) 112, which may either dynamic or non-dynamic memory and incorporated into computing system 102 i.e. an internal device, or attached externally to CPU 104 by means of various, commonly available connection devices such as but not limited to, a universal serial bus (USB) port (not shown).

CRSM 112 is illustrated storing a hypervisor (HYPR) 114 and a number of logical partitions, or LPARs, i.e. a LPAR_1 131, a LPAR_2 132 and a LPAR_3 133. As should be familiar to one with skill in the relevant arts, each of LPAR 131-133 may implement a different operating system (OS) such that multiple OSs (not shown) are able to run concurrently on computing system 102. Also stored on CRSM 112 are two (2) virtual Input/Output servers, i.e. a VIOS_1 116 and a VIOS_2 120, which handle communication tasks associated with LPARs 131-133. VIOS_1 116 and VIOS_2 120 include a Shared Ethernet Adapter (SEA), i.e. a SEA_1 117 and a SEA_2 121, which are each coupled to switch, i.e. a switch_1 126 and a switch_2 127. Coupled to each of SEA_1 117 and SEA_2 121 are also an SEA controller, i.e. SC_1 118 and SC_2 122, respectively. SC_1 118 and SC_2 122 manage failovers in accordance with the claimed subject matter. The implementation and coordination of switches 126 and 127, LPARs 131-133, the respective OSs, VIOSs 116 and 120, SEAs 117 and 121 and SCs 118 and 122 are handled by HYPR 114, as explained in more detail below in conjunction with FIGS. 2-5.

Computing system 102 is connected to an Ethernet 134 via switches 126 and 127. Switches 126 and 127 and Ethernet 134 provide a connection between computing system 102 and several server computers, i.e. a S_1 136 and a S_2 138. Servers 136 and 138 may be any one of a number of different types of servers including, but not limited to, an email server, a database server, and a storage server. Although in this example, computing system 102 and servers 136 and 138 are communicatively coupled via Ethernet 134, they could also be coupled through any number of communication mediums such as, but not limited to, the Internet, a local area network (LAN) and a wide area network (WAN). Servers 136 and 138 are connected to a storage area network (SAN) 140 that includes several storage devices, or logical units, specifically a LUN_1 141, a LUN_2 142 and a LUN_3 143. It should be noted there are many possible computing system configurations, of which computing system architecture 100 is only one simple example.

Figure 2:
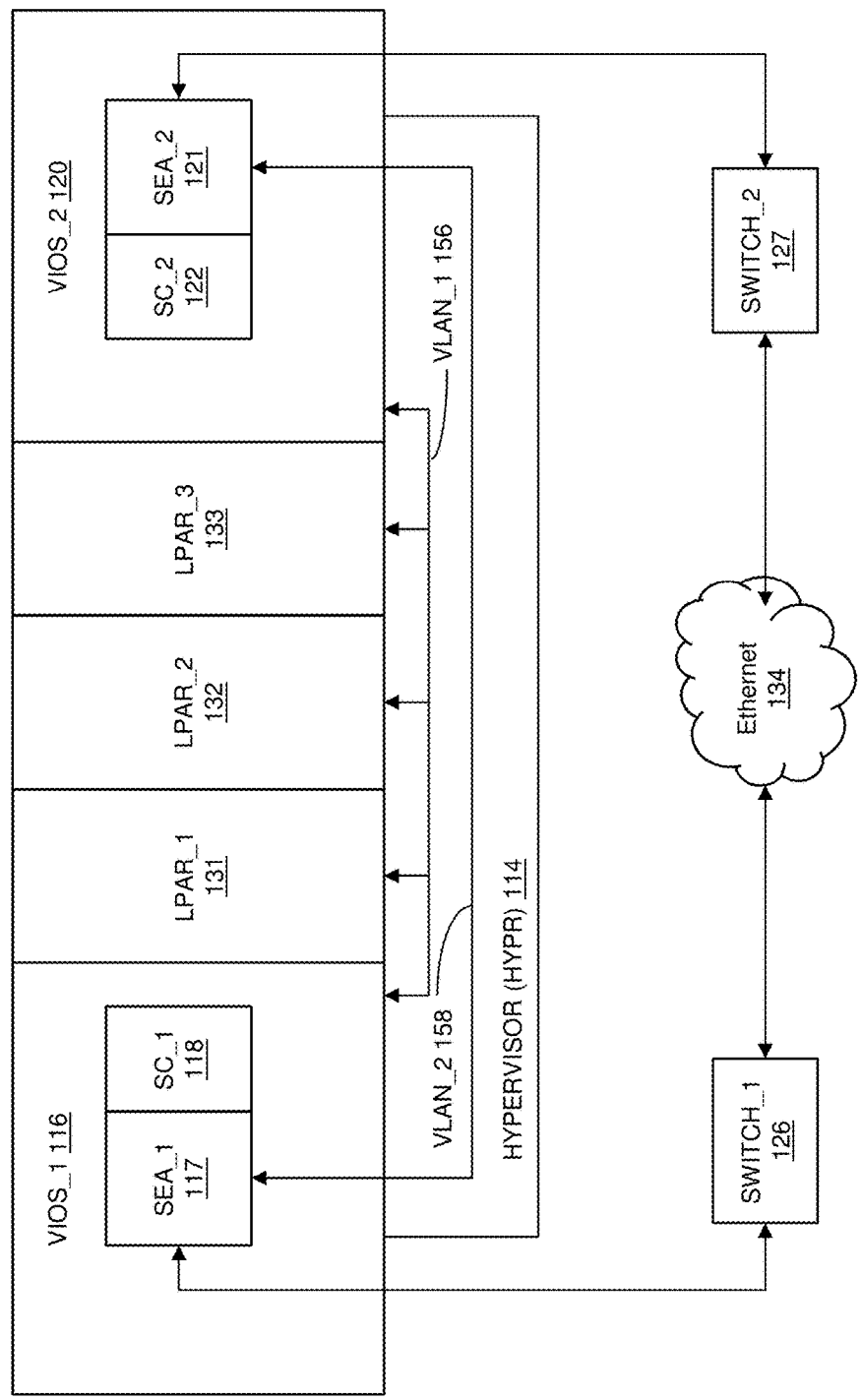
FIG. 2 depicts a block diagram of the computing system architecture of FIG. 1 in more detail, including a primary Shared Ethernet Adapter (SEA) and a backup SEA in accordance with one or more embodiments of the invention.

FIG. 2 is a block diagram of aspects of the computing system architecture 100 of FIG. 1 in more detail. A topology 200 includes HYPR 114, VIOSs 116 and 120. SEAs 117 and 121, SCs 118 and 122, LPARs 131-133, switches 126 and 127 and Ethernet 134, all of which were first introduced above in conjunction with FIG. 1. LPARs 131-133 and VIOSs 116 and 120 are communicatively coupled a virtual Ethernet, i.e. a VLAN_1 156. In addition, SEAs 117 and 121 are each coupled to a control channel, i.e. a VLAN_2 158, which provides communication between SEAs 117 and 121 via HYPR 114. It should be noted that although only two (2) SEAs and (2) VLANs are illustrated and that the disclosed technology is equally applicable to systems with a greater number of such components. In the following examples, SEA_1 117 is described as the primary SEA and SEA_2 121 is described as the backup SEA. The functions of the various components illustrated in FIG. 2 are explained in more detail in conjunction with FIGS. 3-5.

Figure 3:
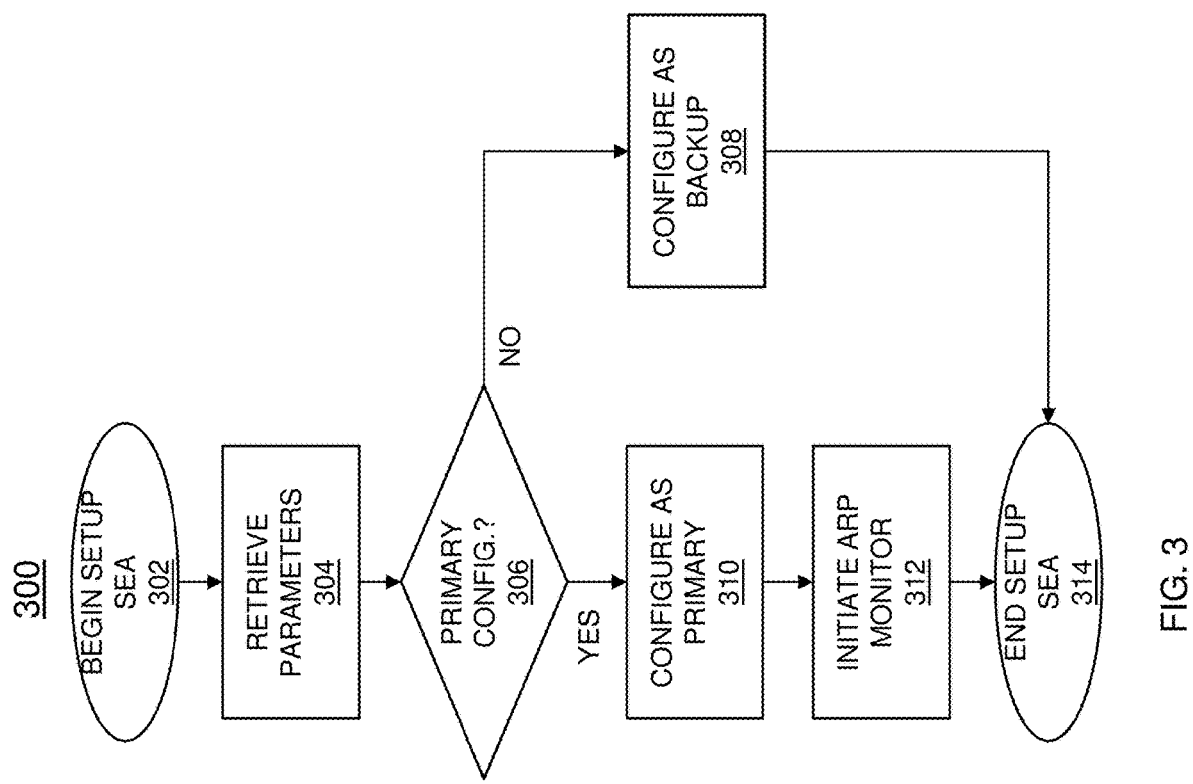
FIG. 3 depicts a flowchart of a Setup SEA process in accordance with one or more embodiments of the invention.

FIG. 3 is a flowchart of one example of a Setup SEA process 300 in accordance with one or more embodiments. In this example, logic associated with process 300 is stored on CRSM 112 (FIG. 1) and executed on one or more processors (not shown) of CPU 104 (FIG. 1) of computing system 102 (FIG. 1). In addition, process 300 is associated with SC_1 118 (FIGS. 1 and 2) and SC_2 122 (FIGS. 1 and 2) of SEA_1 117 and SEA_2 121, respectively, and VIOS_1 116 (FIGS. 1 and 2) and VIOS_2 120 (FIGS. 1 and 2), respectively.

Process 300 starts in a "Begin Configuration (Config.) Shared Ethernet Adapter (SEA)" block 302 and proceeds immediately to a "Retrieve Parameters" block 304. During processing associated with block 304, parameters associated with system architecture 100, computing system 102, HYPR 114, VIOSs 116 and 120 and LPARs 131-133 (FIGS. 1 and 2) are retrieved from CRSM 112. In addition, configuration parameters associated with SCs 118 and 122 are retrieved. Such configuration parameters include, but are not limited to, such configuration options such as timeout values discussed with reference to FIG. 5 and indications of whether each of VIOS 116 and 120 should be originally be configured as a primary or backup.

During processing associated with a "Primary Config.?" block 306, a determination is made, based upon configuration parameters retrieved during processing associated with block 304, whether or not the corresponding VIOS 116 or 120 is to be configured as a primary. As mentioned above in conjunction with FIG. 2, in the following example, VIOS_1 116 is configured as the primary VIOS and VIOS_2 120 as the backup. If a determination is made that the corresponding VIOS 116 or 120 is designated as a backup, control proceeds to a "Configure as Backup" block 308. During processing associated with block 308, the corresponding VIOS 116 or 120, which in this example is VIOS_2 120, is configured as a backup. One aspect of the configuration of a backup is the initiation of a process to detect when a failover from the primary VIOS to the backup VIOS is necessary (see 500, FIG. 5).

If, during processing associated with block 306, a determination is made that the corresponding VIOS 116 or 120 is designated as the primary, control proceeds to a "Configure as Primary" block 310. In addition to the typical functions associated with the configuration of a primary VIOS, the primary, which in this example is VIOS_1 116, a process to implement aspects of the claimed subject matter is initiated during processing associated with an "Initiate Address Resolution Protocol (ARP) Monitor" block 312 (see 400, FIG. 4).

Finally, once the corresponding VIOS 116 or 120 has been configured as a primary or a backup, control proceeds to an "End Setup SEA" block 314 during which process 300 is complete.

Figure 4:
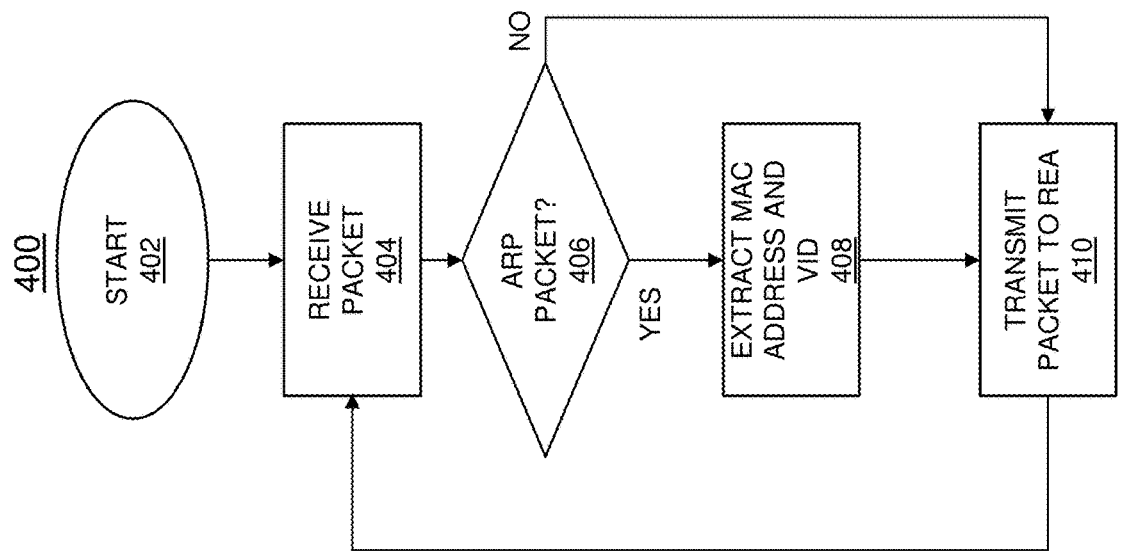
FIG. 4 depicts a flowchart of an ARP monitoring process in accordance with one or more embodiments of the invention.

FIG. 4 is a flowchart of one example of a process 400 in accordance with one or more embodiments of the invention Like process 300, in this example, logic associated with process 400 is stored on CRSM 112 (FIG. 1) and executed on one or more processors (not shown) of CPU 104 (FIG. 1)

of computing system 102 (FIG. 1). In addition, process 400 is associated with SEA_1 117 (FIGS. 1 and 2) and SC_1 118 (FIGS. 1 and 2) of VIOS_1 116 (FIGS. 1 and 2). In the event of a failover from the primary to backup, any new primary would also implement process 400.

Process 400 starts in a block 402 and proceeds immediately to a "Receive Packet" block 404. During processing associated with block 404, the appropriately configured SEA, which in this example is SEA_1 117, examines each packet processed by the corresponding VIOS, which in the example is VIOS_1 116. During processing associated with an "Address Resolution Protocol (ARP) Packet?" block 406, a determination is made as to whether or not the packet received during processing associated with block 404 is an ARP packet. If not ("NO" branch), control proceeds to the Transmit Packet to REA block 410.

If during processing associated with block 406, a determination is made that the received packet is an ARP packet, control proceeds to an "Extract Media Access Control (MAC) Address and VID" block 408. During processing associated with block 408, the MAC address and VID associated with the packet received during processing associated with block 404 is extracted from the packet. In one or more embodiments of the invention, a table storing the MAC address and VID is updated. In addition, the table can store the time at which the packet was received. During processing associated with a "Transmit Packet to REA" block 410, the MAC address and VID extracted during processing associated with block 408 is transmitted to the backup SEA, which in this example is SEA_2 121. SEA_2 121 stored the transmitted address during a failover (see 500, FIG. 5) in accordance with one or more embodiments.

During normal operation, SEA_1 116 continuously processes packets as they are received by VIOS_1 116 unless, of course, computing system 102 halts or an operating system crashes. In such a case, process 400 would also stop executing.

Figure 5:
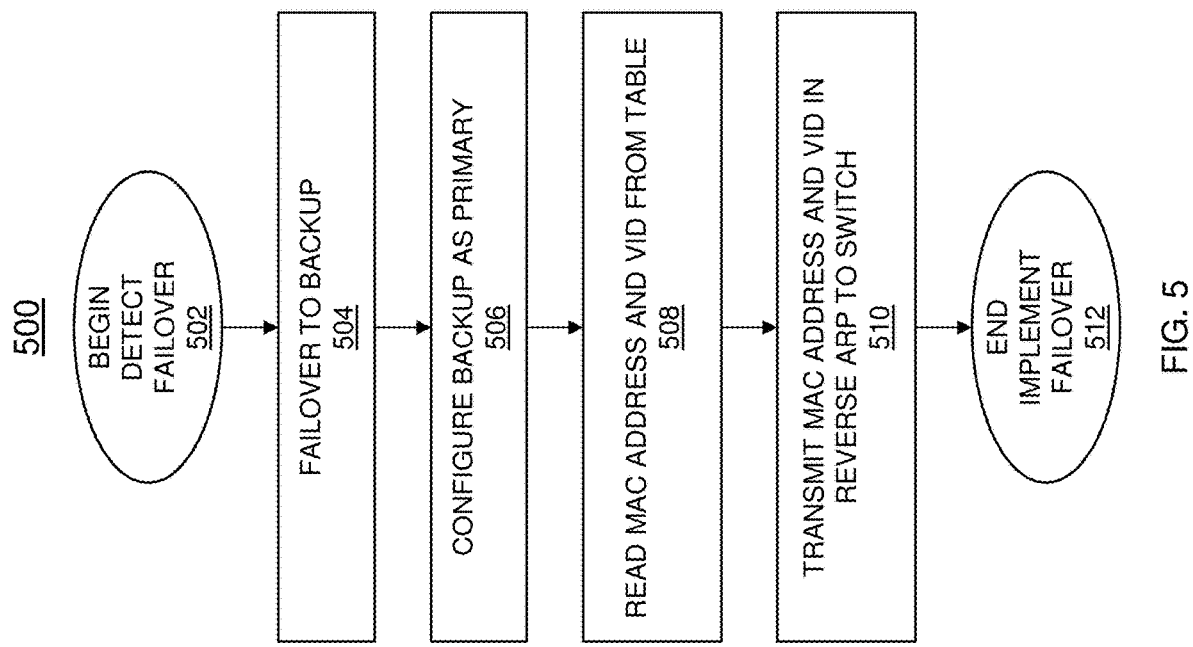
FIG. 5 depicts a flowchart of an Implement Failover process in accordance with one or more embodiments of the invention.

FIG. 5 is a flowchart of one example of an Implement Failover process 500 in accordance with one or more embodiments of the invention. Like processes 300 and 400, in this example, logic associated with process 500 is stored on CRSM 112 (FIG. 1) and executed on one or more processors (not shown) of CPU 104 (FIG. 1) of computing system 102 (FIG. 1). In addition, in this example, process 500 is associated with SEA_2 121 (FIGS. 1 and 2) and SC_2 122 (FIGS. 1 and 2) of VIOS_2 118 (FIGS. 1 and 2).

Process 500 starts in a "Begin Detect Failover" block 502 and proceeds to a "Failover to Backup" block 504 if a failover is detected. A failover can be detected by the SEA_2 121 transmitting a short message, or "ping," to the primary SEA_1 117 requesting an acknowledgment and determining whether or not an acknowledgment has been received. Typically, such a determination is made upon expiration of a timer (not shown) set when the primary is pinged and based upon administrator-defined configuration parameters. If an acknowledgment message is received no failover is detected. It should be noted this is merely one example of a technique for detecting a failover, i.e. detection of the lack of a "heartbeat." In a typical system, there are many different conditions that may trip a failover form a primary SEA to a backup SEA. In each of these different conditions, process 500 would be executed from a block 504 as described below.

If during processing a failover is detected, control proceeds to a "Failover to the Backup" block 504. Those with skill in the appropriate arts will understand the typical steps, including, but not limited to, notifying any other active SEAs of the transition. During processing associated with a "Configure Backup as Primary" block 506, SEA_2 121 makes the transition to primary SEA, including assuming all the duties previously performed by SEA_1 117 and initiating a process to monitor ARP packets (see 300, FIG. 3). At block 508, the processing "Reads MAC Address and VID from Table" to determine which reverse ARPs are to be transmitted. Conventionally, reverse ARPs were transmitted for any and all MAC addresses in the table without regard to the VID.

During processing associated with a "Transmit Reverse ARPs to Switches" block 510, the newly functioning primary SEA transmits reverse ARP messages associated with stored MAC addresses and corresponding VIDs only (determined at block 508), to a switch connected to SEA_2 121, which in this example is switch 127 (FIGS. 1 and 2). Since the reverse ARP packet is conventionally broadcast the packet is also propagated to other switches in computing system architecture 100 such as switch_1 126 coupled to SEA_1 117, the techniques described herein will greatly reduce the number of packets that are transmitted during the failover process. In one or more embodiments of the invention, the reverse ARPs can be propagated to one or more switches. However, the reverse ARPs are not simply broadcast for all MAC addresses for all VLANs, but are instead, transmitted for MAC addresses and their corresponding VIDs. As explained above in conjunction with FIG. 4, MAC addresses and VIDs were transmitted by SEA_1 117 while functioning as the primary and stored by SEA_2 121 while functioning as the backup (see 250, FIG. 4). In this manner, active switches are informed of the transition and packet losses are minimized because switches do not continue to transmit to inactive VIOSs and SEAs.

Once a failover has been implemented during processing associated with blocks 502-510, control proceeds to an "End Implement Failover" block 512 during which process 500 is complete.

Figure 6:
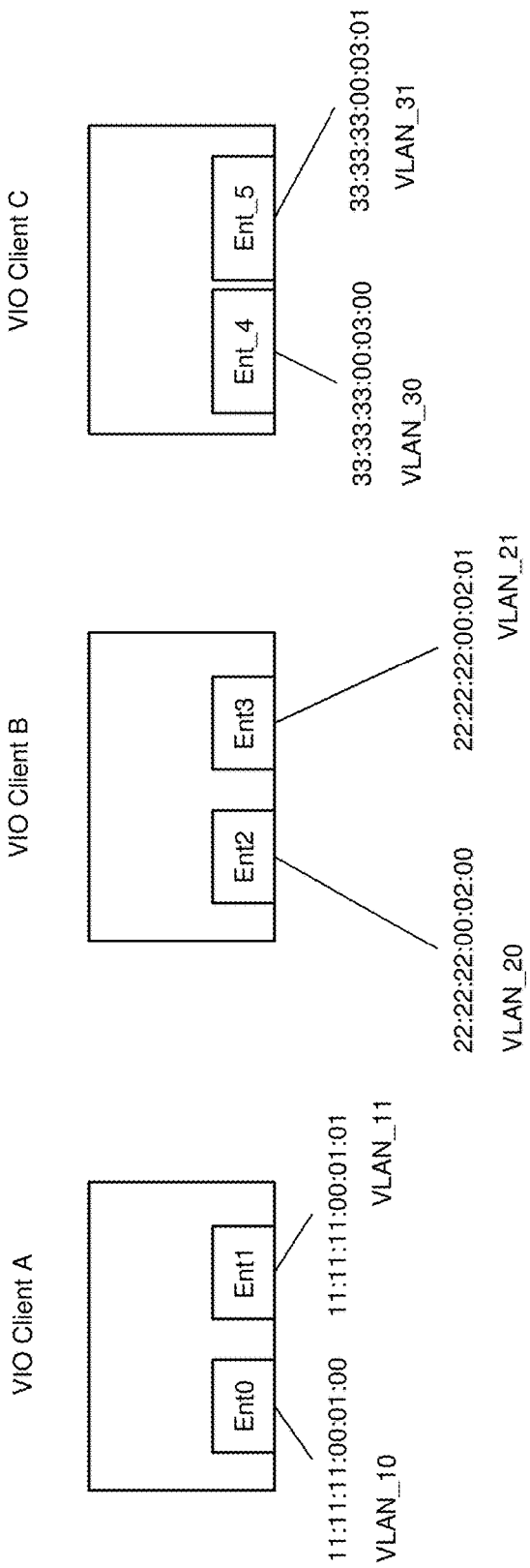
FIG. 6 depicts a block diagram of client devices in accordance with one or more embodiments of the invention.

Now referring to FIG. 6, a VIO Client A, VIO client B and VIO client C that are configured to communicate with the system 100 is shown. As shown in FIG. 6 the VIO client A includes an adapter ent0 configured with MAC address 11:11:11:00:01:00 corresponding to VLAN10 and adapter ent1 configured with MAC address 11:11:11:00:01:01 corresponding to VLAN11. VIO client B includes an adapter ent2 configured with MAC address 22:22:22:00:02:00 corresponding to VLAN20 and adapter ent3 configured with MAC address 22:22:22:00:02:01 corresponding to VLAN21. Also shown in FIG. 6, VIO Client C includes an adapter ent4 configured with MAC address 33:33:33:00:03:00 corresponding to VLAN30 and adapter ent5 configured with MAC address 33:33:33:00:03:01 corresponding to VLAN31. Although only three VIO Clients are shown in FIG. 6 having to adapter/interfaces, it should be understood that any number of VIO Clients and adapters can be used in another example.

Conventionally, in the event of a failover process multiple reverse ARPs are transmitted for the MAC addresses on each of the VIDs. For example, for MAC address 11:11:11:00:01:00, reverse ARPs are transmitted to the switch including (11:11:11:00:01:00, VID10); (11:11:11:00:01:00, VID11); (11:11:11:00:01:00, VID20) . . . (11:11:11:00:01:00, VID31). In addition, reverse ARPs will be sent for 11:11:11:00:01:01 for all VIDs, as well as for MAC addresses 22:22:22:00:02:00 and 22:22:22:00:02:01. As the number of VLANs increases, the number of reverse ARPs that are transmitted in a conventional configuration are increased.

In a non-limiting example illustrating an embodiment of the invention, an SEA is configured with VIDs 10, 11, 20 . . . 31. Therefore, in the event of a failover process, such as the failover process 500 described with reference to FIG. 5, for MAC address 11:11:11:00:01:00, a reverse ARP is transmitted with address information (11:11:11:00:01:00, VID10) to the switch; for MAC address 11:11:11:00:01:01 a reverse ARP is transmitted with (11:11:11:00:01:01, VID11) to the switch; for MAC address 22:22:22:00:02:00, a reverse ARP is transmitted with (22:22:22:00:02:00, VID20) to the switch; for MAC address 22:22:22:00:02:01, a reverse ARP is transmitted with (22:22:22:00:02:01, VID21) to the switch; and for any given MAC address for any other clients, a reverse ARP is transmitted with the MAC address and VID configured with the MAC address.

A limited number of reverse ARPs are transmitted to the switch for 11:11:11:00:01:00 (for VID10) as opposed to the plurality of reverse ARPs transmitted using the conventional techniques referred to in the previous example, where the reverse ARPs are transmitted for VIDs that are not associated with the given MAC addresses. In the previous example, six reverse ARPs were sent to the switch. In addition, six more reverse ARPs were sent for each additional MAC address, and so on, for all MAC addresses for the VIO Clients, without regard to whether the MAC addresses were associated with the VLANs.

Using the techniques described herein, the reverse ARPs are only transmitted for MAC addresses for a particular VLAN ID (VID). After the failover process where the backup SEA is configured as the primary SEA, the newly configured SEA transmits the reverse ARPs to the switch where the reverse ARPs are not flooded for each and every MAC address and adapter/interface but are transmitted to the switch according the MAC address and VID.

Figure 7:
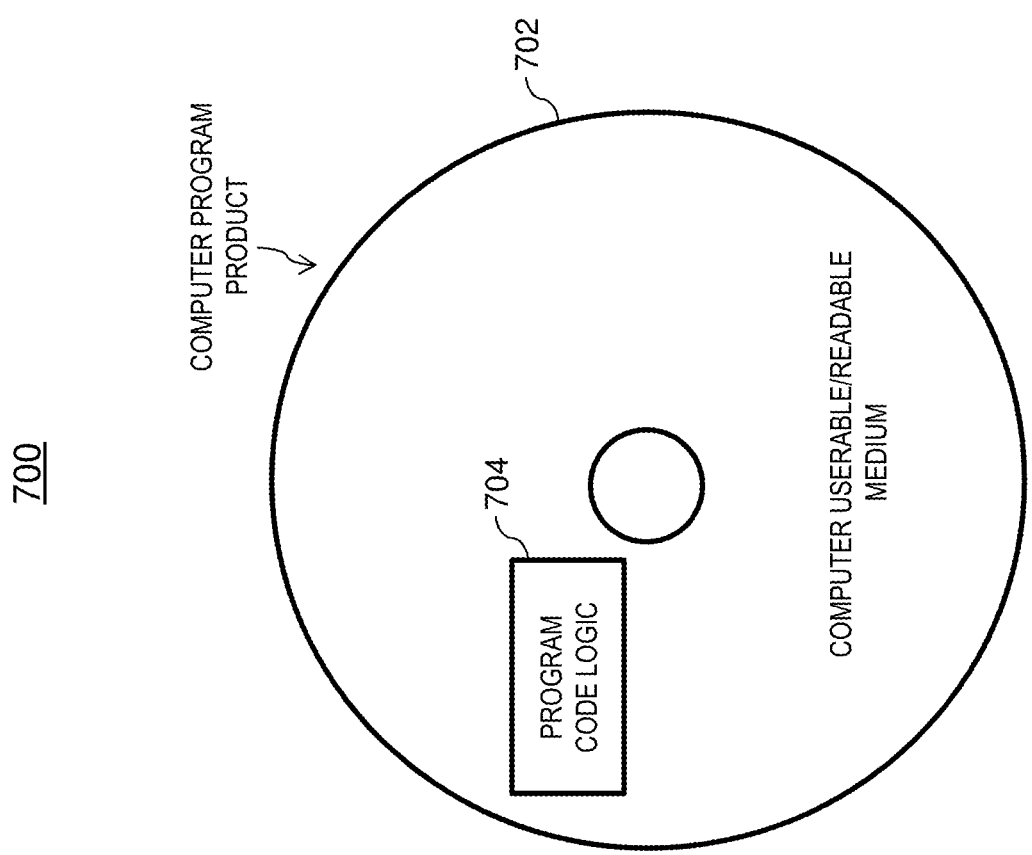
FIG. 7 depicts a computer program product in accordance with one or more embodiments of the invention.

Referring now to FIG. 7, a computer program product 700 in accordance with an embodiment that includes a computer-readable storage medium 702 and program instructions 704 is generally shown.

The techniques described herein improve over the prior art by reducing the network overhead limiting the number of reverse ARPs that are transmitted during a failover process and conserving address table storage used to mapping the MAC address, network addresses, and VIDs. In addition, the security of the network is also improved due to limiting the transmission of reverse ARPs to only MAC addresses based on the VID, where VLANs having no relationship to the MAC will not receive the updated address information after by flooding the reverse ARPs.

The technical effects and benefits include increasing the security and reliability of a network, and reducing waste of network bandwidth during a failover event. In addition, the technical effects and benefits include reducing the amount of overhead transmitted in the network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for implementing shared Ethernet adapter (SEA) failover, the computer-implemented method comprising:
   receiving a first address resolution protocol (ARP) packet at a first SEA coupled to a first switch;
   parsing, by the first SEA, a first MAC address and VLAN ID (VID) corresponding to the first ARP packet;
   transmitting the first MAC address and VID to a second SEA coupled to a second switch;
   detecting that the first SEA has transitioned from a primary configuration to an inactive configuration and that the second SEA has transitioned from a backup configuration to the primary configuration;
   responsive to the detecting, transmitting a reverse ARP packet to the second switch coupled to the second SEA notifying the second switch that the first SEA has transitioned to an inactive configuration and that the second SEA has transitioned to an active configuration;
   configuring the first switch to forward any subsequent packets to the second switch rather than the first SEA;
   storing the first MAC address and VID, and a second MAC address and VID corresponding to a second ARP packet; and
   transmitting the second MAC address in conjunction with the transmitting of the first MAC address.

2. The computer-implemented method of claim 1, further comprising:
   detecting that the first SEA has transitioned from the backup configuration to the primary configuration and that the second SEA has transitioned from the primary configuration to the backup configuration; and
   responsive to the detecting, transmitting a reverse ARP packet to the first switch coupled to the first SEA notifying, the first switch that the first SEA has transitioned to the primary configuration; and
   configuring the second switch to forward any subsequent packets to the first switch rather than the second SEA.

3. The computer-implemented method of claim 1, wherein the transmitting the reverse ARP packet is based at least in part on the VID such that the reverse ARP packet is received by the first SEA.

4. The computer-implemented method of claim 1, wherein the claimed method is executed in conjunction with a hypervisor.

5. The computer-implemented method of claim 4, wherein the first SEA and the second SEA communicate via a control channel associated with the hypervisor.

6. A system for implementing a shared Ethernet adapter (SEA) failover comprising:
   a first SEA;
   a first switch coupled to the first SEA;
   a second SEA;
   a second switch coupled to the second SEA;
   a processor;
   a computer-readable storage medium (CRSM) coupled to the processor, wherein the processor is configured to:
      receive a first address resolution protocol (ARP) packet at the first shared Ethernet adapter (SEA) coupled to the first switch;
      parse, by the first SEA, a first MAC address and VLAN ID (VID) corresponding to the first ARP packet;
      transmit the first MAC address and VID to the second SEA coupled to the second switch;
      detect that the first SEA has transitioned from a primary configuration to an inactive configuration and that the second SEA has transitioned from a backup configuration to the primary configuration;
      responsive to the detection, transmit a reverse ARP packet to the second switch coupled to the second SEA notifying the second switch that the first SEA has transitioned to an inactive configuration and that the second SEA has transitioned to an active configuration;

configure the first switch to forward any subsequent packets to the second switch rather than the first SEA;

store the first MAC address and VID, and a second MAC address and VID corresponding to a second ARP packet and transmit the second MAC address in conjunction with the transmitting of the first MAC address.

7. The system of claim 6, wherein the processor is configured to:

detect that the first SEA has transitioned from the backup configuration to the primary configuration and that the second SEA has transitioned from the primary configuration to the backup configuration; and responsive to the detecting, transmit a reverse ARP packet to the first switch coupled to the first SEA notifying, the first switch that the first SEA has transitioned to the primary configuration; and configuring the second switch to forward any subsequent packets to the first switch rather than the second SEA.

8. The system of claim 6, wherein the processor is configured to transmit the reverse ARP packet is based at least in part on the VID such that the reverse ARP packet is received by the first SEA.

9. The system of claim 6, further comprising a hypervisor, wherein the hypervisor is coupled to one or more logical partitions and servers.

10. The system of claim 9, wherein the servers comprise an SEA and an SEA controller.

11. The system of claim 9, further comprising a control channel coupling the first SEA and the second SEA communicate via a control channel associated with the hypervisor.

12. A computer program product for implementing a shared Ethernet adapter (SEA) failover, the computer program product comprising:

a computer readable storage medium having program instructions stored thereon executable by a processor to cause the processor to:

receive a first address resolution protocol (ARP) packet at a first shared Ethernet adapter (SEA) coupled to a first switch;

parse, by the first SEA, a first MAC address and VLAN ID (VID) corresponding to the first ARP packet;

transmit the first MAC address and VID to a second SEA coupled to a second switch;

update a local table with the first MAC address and VID;

detect that the first SEA has transitioned from a primary configuration to an inactive configuration and that the second SEA has transitioned from a backup configuration to the primary configuration; and responsive to the detection, transmit a reverse ARP packet to the second switch coupled to the second SEA notifying the second switch that the first SEA has transitioned to an inactive configuration and that the second SEA has transitioned to an active configuration; and configure the first switch to forward any subsequent packets to the second switch rather than the first SEA.

13. The computer program product of claim 12, wherein the instructions are further executable by the processor to cause the processor to:

detect that the first SEA has transitioned from the backup configuration to the primary configuration and that the second SEA has transitioned from the primary configuration to the backup configuration; and responsive to the detection, transmit a reverse ARP packet to the first switch coupled to the first SEA notifying, the first switch that the first SEA has transitioned to the primary configuration; and configure the second switch to forward any subsequent packets to the first switch rather than the second SEA.

14. The computer program product of claim 12, wherein the transmitting the reverse ARP packet is based at least in part on the first MAC address and VID such that the reverse ARP packet is received by the first SEA.

15. The computer program product of claim 12, wherein the instructions are further executable by the processor to cause the processor to:

store the first MAC address and VID, and a second MAC address corresponding to a second ARP packet; and transmit the second MAC address in conjunction with the transmitting of the first MAC address and VID.

16. The computer program product of claim 12, wherein the instructions are executed in conjunction with a hypervisor.

17. The computer program product of claim 16, wherein the first SEA and the second SEA communicate via a control channel associated with the hypervisor.

18. The computer program product of claim 17, wherein the hypervisor is coupled to one or more logical partitions and servers, wherein the servers comprise an SEA and an SEA controller.

\* \* \* \* \*